Patented Sept. 15, 1931

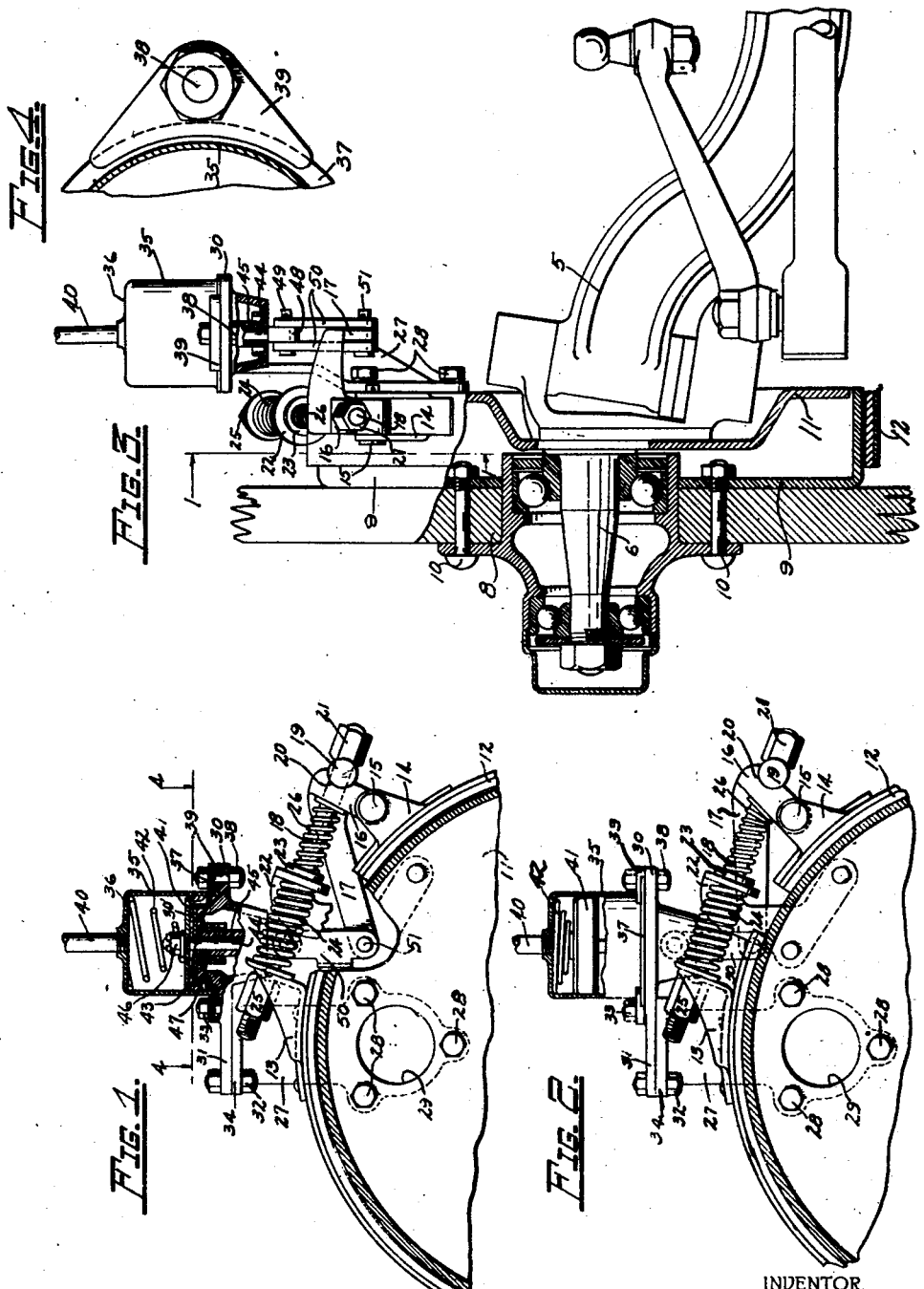

1,823,589

UNITED STATES PATENT OFFICE

NIELS A. CHRISTENSEN, OF CLEVELAND, OHIO

VEHICLE BRAKE

Application filed August 9, 1928. Serial No. 298,535.

The invention relates to vehicle brakes.

The object of the invention is to provide a power brake and more particularly a brake construction in which vacuum is the source of power.

A further object of the invention is to provide a brake cylinder mounting whereby brakes equipped for manual or cam operation may be readily converted into power brakes.

The invention further consists in the several features hereinafter set forth and pointed out in the appended claim.

In the drawings Fig. 1 is a detail vertical sectional view through the brake drum, taken along the line 1—1 of Fig. 3, parts of the brake actuator being broken away and parts being shown in section, with the brake in release position;

Fig. 2 is a view similar to Fig. 1, showing the brake in applied position;

Fig. 3 is a side elevation view of the brake, parts being broken away and parts being shown in section;

Fig. 4 is a detail sectional view taken on the line 4—4 of Fig. 1 with the piston omitted and parts broken away.

Referring to the drawings, the numeral 5 designates the axle, here shown as the front axle of an automotive vehicle, 6 the steering knuckle, 8 the front wheel, 9 the brake drum secured by bolts 10 to the wheel, 11 a brake support, here shown in the form of a disk, which is bolted or otherwise suitably secured to the steering knuckle 6. It will, of course, be understood that the brake mechanism herein described may also be associated with the rear wheels of the vehicle.

The brake member 12 is here shown as an external contracting band type brake which is mounted intermediate its ends in any suitable manner on the brake support 11 and is provided with lugs 13 and 14.

The space ears of the lug 14 carry a pivot pin 15 upon which the arm 16 of a bell crank lever 17 is mounted. A bolt 18 passes through an opening in the inner end of the arm 16 and an opening in the lug 13 and through an opening in a pivot pin 19 which seats in recesses 20 of said arm and is secured in operative position relative thereto by a nut 21.

A bracket 22 is secured to the brake support and has an opening through which said bolt 18 passes, said bolt having a shoulder portion 23 abutting the front side of said bracket. A release spring 24 is interposed between the bracket 22 and the lug 13 and an adjusting nut 25 is mounted on the outer end of said bolt 18 adjacent said lug for the purpose of taking up clearance on this end. The adjusting nut 21 also takes up clearance at the opposite end and a light spring 26 is interposed between the arm 16 and the shoulder portion 23 for the purpose of preventing rattle and for assisting in the release.

With this construction, when the free end of the lever 17 is swung upwardly the ends of the band will be drawn together against the pressure of their release springs and the band will thus exert a braking force against the drum, the parts being then in the position shown in Fig. 2, and a release of force on the lever 17 causes the springs 24 and 26 to move the brake member to the release position shown in Fig. 1.

A bracket 27 is secured by three bolts 28 to the brake support 11 adjacent an opening 29 which is ordinarily provided for a manually operated shaft. The rear cover plate 30 of a brake cylinder has a laterally offset portion 31 secured by bolts 32 and 33 to the laterally offset flanged pad portion 34 of the bracket 27.

The brake cylinder 35 is in the form of a pressed steel cylinder having a closed upper end 36 and a flanged lower end 37. This lower end is clamped to the cover plate 30 by the nuts of the bolts 33 and 38 each engaging a flanged clip 39 mounted thereon and engaging the flange portion of said brake cylinder.

A pipe 40 for connection with either a source of suction or atmosphere communicates with the upper end of the cylinder 35.

A suitably packed piston 41 works in the brake cylinder 35 and is moved to release position by a spring 42 interposed between it and the upper closed end of the brake cylinder. The piston has a rod 43 in the form of a bolt 44 and sleeve 45 secured thereto by a nut 46 and having a flanged dust guard associated with the lower end therefor, the sleeve 45 being guided in a bushed opening 47 in the cover plate 30. In a movement to release position air behind the piston may escape along the sleeve 45 or through an opening 30' in the cover plate.

The bolt 44 has an eye 48 through which a pin 49 passes and spaced links 50 connect said pin to a pin 51 on the free end of the lever 17.

With this construction, when the connection of pipe 40 with the intake manifold is established, thereby producing a vacuum in the cylinder 35, the piston 41 and its rod 44, 45 moves upwardly in said cylinder thereby swinging the lever 17 to apply the brake member, as previously described, and the release of vacuum permits the spring 42 to return the piston and its parts to release position while the brake elements move to release position as heretofore described.

I desire it to be understood that this invention is not to be limited to any particular form or arrangement of parts except insofar as such limitations are included in the claim.

What I claim as my invention is:

In brake mechanism for automotive vehicles, the combination with a brake drum, an external contracting band brake and a lever for applying the same, of a brake support, a bracket secured to said support and having a laterally offset pad portion, a brake cylinder cover having an offset portion secured to said pad portion, a brake cylinder mounted on said cover, a suction-operated piston working in said cylinder and provided with a rod guided in said cover, and a link connection between said rod and said lever.

In testimony whereof, I affix my signature.

NIELS A. CHRISTENSEN.